United States Patent [19]

Ikeuchi et al.

[11] Patent Number: 4,753,811
[45] Date of Patent: Jun. 28, 1988

[54] METHOD FOR COLORING FOOD PRODUCTS

[75] Inventors: Hiroji Ikeuchi; Kiyoaki Ikeuchi, both of Akashi, Japan

[73] Assignee: Kabushiki Kaisha Ikeuchi Tekkosho, Akashi, Japan

[21] Appl. No.: 75,576

[22] Filed: Jul. 20, 1987

[30] Foreign Application Priority Data

Jan. 22, 1987 [JP] Japan .................................. 62-13105

[51] Int. Cl.⁴ ........................ A23L 1/27; A23L 1/325; A23P 1/00
[52] U.S. Cl. .................................. 426/250; 426/305; 426/513; 426/643
[58] Field of Search ............... 426/250, 513, 643, 305, 426/412

[56] References Cited

U.S. PATENT DOCUMENTS 4,497,844 2/1985 Hice et al. .......................... 426/513
4,503,081 3/1985 Ikoma et al. ....................... 426/643

Primary Examiner—George Yeung
Attorney, Agent, or Firm—Marshall, O'Toole, Gerstein, Murray & Bicknell

[57] ABSTRACT

A method for coloring minced fish meat products wherein a paste-like dye is applied to the edge of an injection opening of a split mold, the mold having a cavity in the form of a cooked-and-peeled meat of a crustacean such as shrimp or crab. Minced meat of fish or the like is later injected into the cavity through the opening, the dye being moved along the inner surface of the cavity along with and due to the movement of the injected material, and the dye is applied to the inner surface of the cavity and to the surface of the injected minced meat material. The apparatus for coloring the minced fish meat products is comprised of a mold having a cavity for shaping a food product and an injection opening for injecting minced fish meat material into the cavity. A food color injection device is provided comprising a pair of nozzles located close to the opening of the mold, the nozzles being capable of free insertion into and retraction from the opening. A mechanism is also provided for injecting minced fish meat material into the cavity. The pair of nozzles of the color injection device are made of a flexible material and are flat in section and have, on the end of each, an outward port lacking the outward side. A head-shaped object is placed between the two nozzles, the object being movable in the direction of the insertion and withdrawal of the nozzles. A paste-like dye is supplied by the nozzles and is applied to the edge of the injection opening by movement of the object, so that the dye will be applied to the surface of the minced meat material when the minced meat material is injected into the opening.

1 Claim, 2 Drawing Sheets

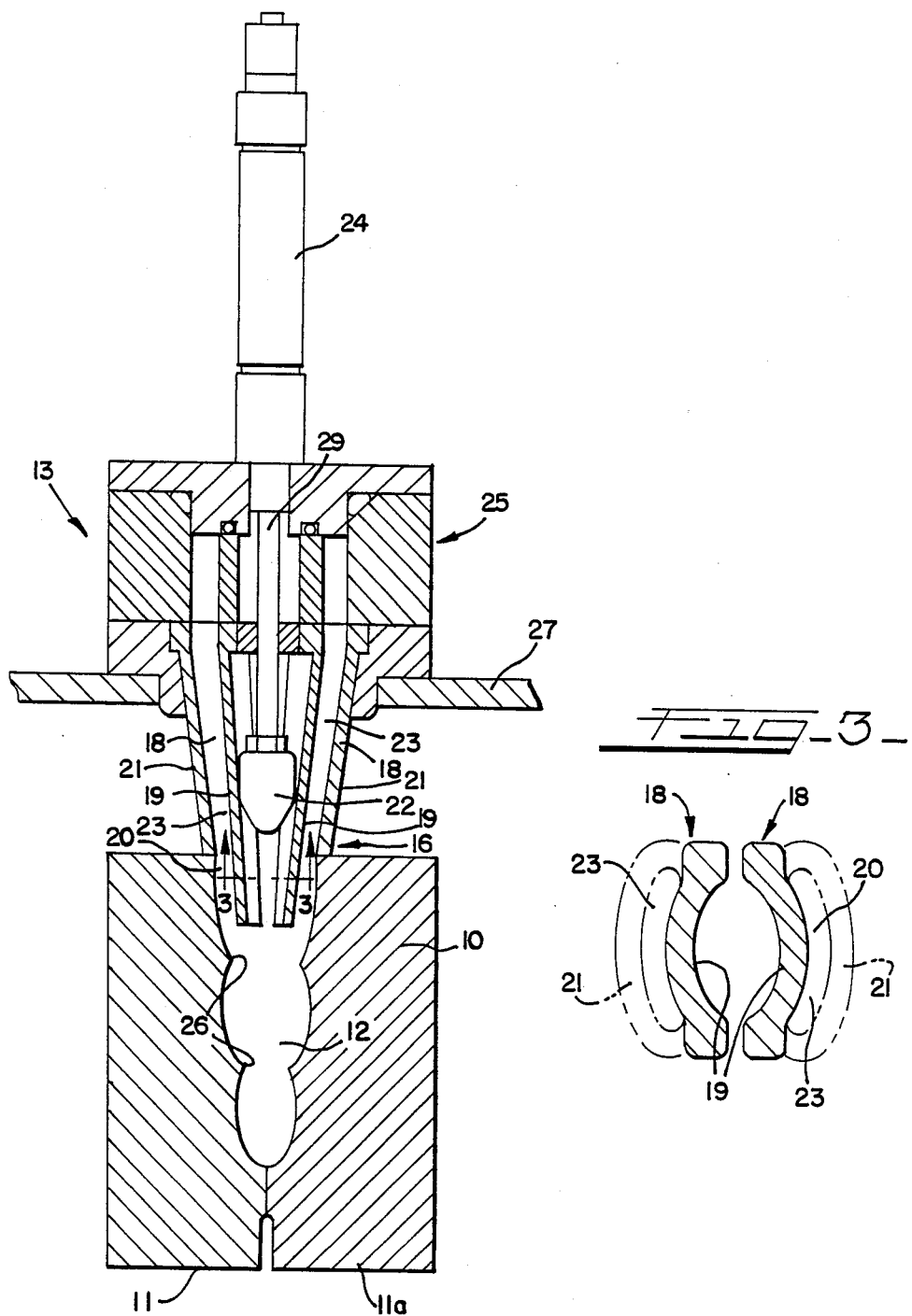

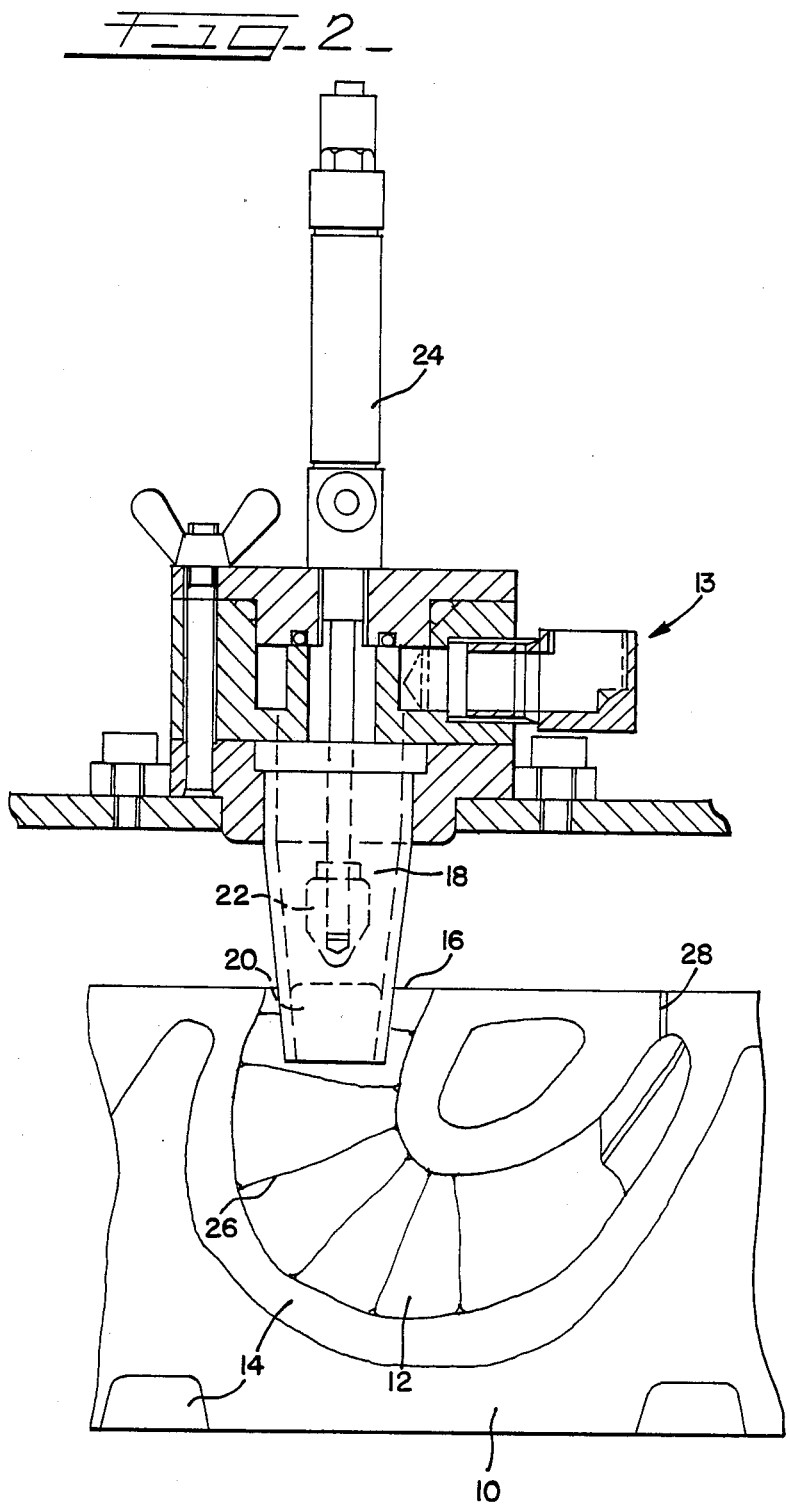

METHOD FOR COLORING FOOD PRODUCTS

FIELD AND BACKGROUND OF THE INVENTION

The present invention relates to a method and apparatus for producing a minced fish meat food product, using a split mold, in the form of the body of a shrimp or the meat of claws of a crab, and coloring the product with a tone close to the natural article.

The present inventors have established a method and apparatus for coloring minced fish meat food products in shapes of shrimp, crab, etc., as shown in their U.S. patent application Ser. No. 818,618, now U.S. Pat. No. 4,692,341. The disclosure of that application is incorporated herein by reference. The method and apparatus disclosed in the above application differs from the prior conventional method wherein a bar-shaped minced meat product is wrapped with a polyethylene film coated with a red food dye, and is then boiled or steam cooked to transfer the dye to the product. The above application discloses a method wherein an aqueous food dye is sprayed into the cavity of a split mold, then the minced fish meat material is injected into the cavity, and thereafter the material is heated to solidify the material and produce a colored product.

In the prior art described in the above application, since a liquid coloring dye is sprayed into the cavity of a split mold, the amount of the dye sprayed into the cavity tends to be excessive and the dye might drip from the joint between the halves of the mold. Hence it is necessary, as a countermeasure, to control the amount of the dye sprayed and provide a fine control of the supply of the dye. Such control is, however, rather difficult since it requires that the spraying time of the dye be kept less than a second.

SUMMARY OF THE INVENTION

A first aspect of the present invention comprises a method for coloring minced fish meat products wherein a paste-like dye is applied to the edge of an injection opening of a split mold, the mold having a cavity in the form of a cooked-and-peeled meat of a crustacean such as shrimp or crab. Minced meat of fish or the like is later injected into the cavity through the opening, the dye being moved along the inner surface of the cavity along with and due to the movement of the injected material, and the dye is applied to the inner surface of the cavity and to the surface of the injected minced meat material.

A second aspect of this invention comprises apparatus for coloring minced fish meat products, wherein the apparatus is comprised of a mold having a cavity for shaping a food product and an injection opening for injecting minced fish meat material into the cavity. A food color injection device is provided comprising a pair of nozzles located close to the opening of the mold, the nozzles being capable of free insertion into and retraction from the opening. Means is also provided for injecting minced fish meat material into the cavity. The pair of nozzles of the color injection device are made of a flexible material and are flat in section and have, on the end of each, an outward port lacking the outward side. A head-shaped object is placed between the two nozzles, the object being movable in the direction of the insertion and withdrawal of the nozzles. A paste-like dye is supplied by the nozzles and is applied to the edge of the injection opening by movement of the object, so that the dye will be applied to the surface of the minced meat material when the minced meat material is injected into the opening.

BRIEF DESCRIPTION OF THE DRAWINGS

The invention will be better understood from the following detailed description taken in conjunction with the accompanying figures of the drawings, wherein:

FIG. 1 is a front sectional view of apparatus in accordance with this invention;

FIG. 2 is a side sectional view of the apparatus; and

FIG. 3 is an enlarged sectional view taken on the line 3—3 of FIG. 1.

DETAILED DESCRIPTION OF THE DRAWINGS

A split mold 10, preferably made of metal, is formed by two halves 11 and 11a which are mounted below a food coloring injection device 13. The interior side of one half 11 of the mold 10 is shown in FIG. 2. A cavity 12 for forming a food product conforms to the shape of a cooked-and-peeled shrimp in this specific example, and the portions 14 of the mold are lands for mating the halves of the mold.

The device 13 comprises a pair of nozzles 18 for applying a food coloring dye which is inserted from above into an injection opening 16 of the cavity 12. With reference to FIGS. 1 and 3, each nozzle 18 is formed by an interior wall 19 and an exterior wall 21, the two walls of each nozzle being connected and forming an inner nozzle passage 23. Adjacent the lower end of each nozzle, the lower end of the exterior wall 21 is cut away to form a slanted nozzle port 20. The interior wall 19 of each nozzle extends downwardly farther than the port 20. The walls of the nozzles are made of a flexible material such as plastic so that the walls may bend slightly.

The two nozzles are supported on their upper ends by a housing 25 which is, in turn, supported by a plate 27. The plate 27 is movable in the vertical direction relative to the mold 10 to move the nozzles 18 into or out of the injection opening 16 of the cavity 12.

Centrally mounted on the housing 25 is a cylinder 25 and a movable rod 29. The cylinder 24 may be hydraulic, pneumatic or a solenoid for example. The rod 29 extends downwardly between the two nozzles 18, and a spreading head 22 is fastened to the lower end of the rod 29. As shown in FIG. 1, the two nozzles 18 taper downwardly and toward each other, and the distance between the interior walls 19 is less than the lateral width of the head 22 adjacent the ports 20.

During the coloring process, the nozzles 18 for applying the dye are lowered down to the position shown in FIG. 1 relative to the mold 11, and the lower ends of the interior walls 19 extend into the cavity. The lower ends of the exterior walls are approximately even with and engage the upper surface of the mold, as shown in FIG. 1. The dye is fed through the two nozzle passages to the ports 20 on the forward ends of the nozzles 18. The head 22 is initially displaced upwardly from the ports 20 to the position shown in FIGS. 1 and 2. Then the spreading head 22 is lowered by actuating the cylinder 24 to extend the rod 29, and the head pushes, from the interior, the inner walls 19 adjacent the forward ends of the nozzles 18. The head 22 moves down to a position (not shown) adjacent the ports 20. Thus the two inner walls 19 are spread apart and the two ports 20 are pressed against both side edges of the opening 16 of the cavity 12 by bending the walls 19 outwardly and smearing the paste-like dye onto the edges. After that, the nozzles 18 are lifted upwardly by moving the plate 27, and a volume of the dye will be wiped onto and left on both edges of the opening 16.

In the subsequent step, which is not illustrated, the coloring apparatus is moved away from the opening 16 and a food injection apparatus (described in the above-mentioned application) is moved to a position at the opening 16. A minced fish meat material or the like is injected through the opening 16, and a part of the dye will be transferred, with the movement of the meat material, along the inner surface of the cavity 12 for food product 12. In the process, the dye will be applied thinly to the cavity surface and at the same time the dye will be applied to the surface of the meat material. A considerable amount of the dye will be accumulated at the projections 26 in the cavity 12 because they wipe across the outer surface of the meat material, and almost no dye will be applied to the portions immediately downstream of the projections 26, and the dye will be applied thinly to the remaining intermediate portions. Thus this variation of coloring closely resembles the appearance of the natural cooked-and-peeled shrimp. The numeral 28 denotes an air vent in the cavity 12 for the convenience of the material injection. When the cavity is filled with the minced meat material, the mold 10 will be heated according to an appropriate prior art procedure, and the material will be solidified into a cooked-and-peeled shrimp form, and then will be taken out of the mold as a food product.

In summary, the paste-like dye may be composed of a base such as minced fish meat and a coloring dye mixed together with the base. The paste-like dye is fed into the nozzles 18, and fed up to the port 20 at the end of each nozzle. Next, the forward ends of the nozzles are inserted into the opening of the cavity for a food product. Then the head 22 between the two nozzles is shifted downwardly to move the nozzle ports 20 outwards and the dye is pressed against and applied to the edges of the opening. After the dye is squeezed out and on the edges of the opening, the nozzles are withdrawn from the mold, and the process proceeds to the next step which is the injection of minced meat material. When the minced meat material is injected through the material nozzle, the material will be injected while smearing the dye present on the opening edge over the inner wall of the cavity. When the mold is for a cooked-and-peeled shrimp shape, the dye will be applied more to the nodes of the shrimp and thinly to other flat portions. At the same time, the dye will be applied to the surface of the minced meat material injected. In the subsequent process step, the product is heated and solidified to exhibit a color tone closely resembling the natural cooked-and-peeled shrimp. When the mold is for a crab leg meat, the corners of the product are colored more and flat portions thinly; thus the product receives a coloring which is very similar to the natural one. The mold is preferably made of metal and the cavity may have a Teflon coating.

Hence the coloring is reliable in comparison with the conventional spraying of a liquid dye in the cavity; the process is free of problems experienced in the prior art method, such as excessive coloring and dripping of the dye from the joint of the mold. Furthermore, the process is very convenient since the thickness or viscosity of the dye can be adjusted by adjusting the proportions of the dye and the base of minced meat. Accordingly, the present invention is effective in simplifying the process in the mass production of minced meat products in the form of cooked-and-peeled shrimp, crab, etc.

What is claimed is:

1. A method for coloring a minced meat material using a split mold, the mold having a cavity therein and an injection opening leading to the cavity, comprising the steps of applying a paste-like dye to the edge of said opening of said cavity, injecting the minced meat material into the cavity through said opening and against said dye, said dye being moved along the inner surface of the cavity with the movement of the injected minced meat material, and the dye being applied to the inner surface of the cavity and to the surface of the injected minced meat material.

* * * * *